United States Patent

Hamilton

[15] 3,675,037
[45] July 4, 1972

[54] TECHNIQUE FOR SYNCHRONOUS PARALLEL OPERATION OF STATIC INVERTERS

[72] Inventor: Billy Harold Hamilton, Summit, N.J.

[73] Assignee: Bell Telephone Laboratories, Incorporated, Murray Hill, N.J.

[22] Filed: June 1, 1971

[21] Appl. No.: 148,681

[52] U.S. Cl. ............................307/51, 307/58, 307/82, 307/87, 321/27
[51] Int. Cl. ............................................H02j 3/38
[58] Field of Search............................307/30, 51, 58, 82, 87; 321/27

[56] References Cited

UNITED STATES PATENTS

| | | | |
|---|---|---|---|
| 3,217,171 | 11/1965 | Coney | 307/87 X |
| 3,390,320 | 6/1968 | Kammiller et al. | 307/58 X |
| 3,538,405 | 11/1970 | Borden et al. | 307/82 X |
| 3,549,977 | 12/1970 | Watkins | 307/82 X |
| 3,621,365 | 11/1971 | Beck et al. | 307/82 X |

Primary Examiner—William M. Shoop, Jr.
Attorney—R. J. Guenther and E. W. Adams, Jr.

[57] ABSTRACT

A plurality of static inverters are connected in parallel to a common bus. A frequency and voltage control feedback loop in each inverter encompasses the load terminals and permits the inverter to operate independently with only its output terminals common to the rest of the system. The inverter output is harmonized with the common signal on the bus by achieving orthogonality between the real and reactive output currents and the voltage and frequency, respectively, of the common signal on the bus. The orthogonality is obtained by applying appropriate voltage magnitude and phase correction signals to the internal voltage generating mechanism of each individual inverter. This permits the utilization of the inverters in parallel without the necessity of using some common reference frequency signal source and hence improves reliability of the system.

10 Claims, 8 Drawing Figures

INVENTOR
B. H. HAMILTON
BY *Alfred O. Steinmetz*
ATTORNEY

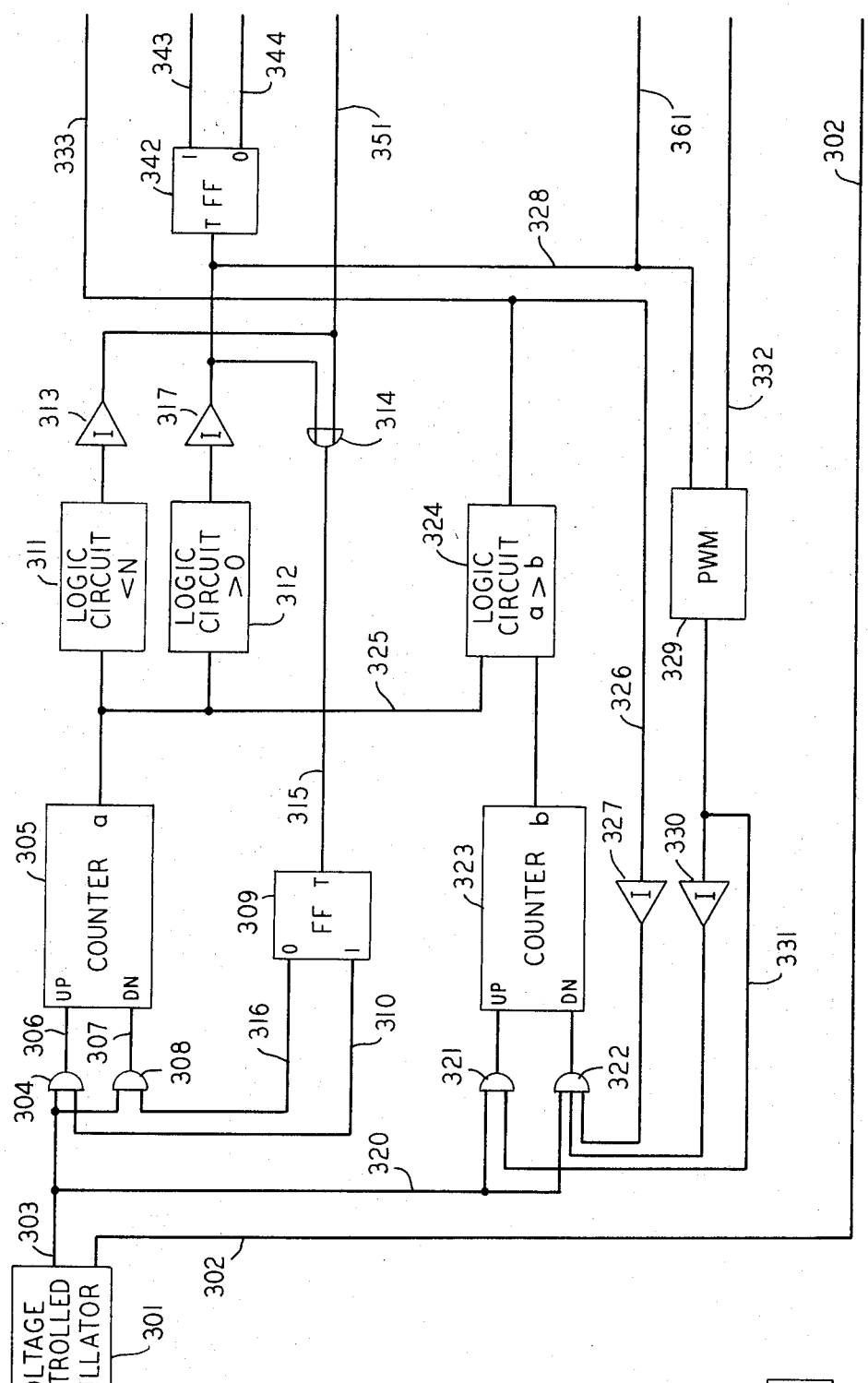

TECHNIQUE FOR SYNCHRONOUS PARALLEL OPERATION OF STATIC INVERTERS

BACKGROUND OF THE INVENTION

This invention relates to the parallel operation of static inverters and is more particularly concerned with synchronizing the parallel inverters to a common interconnecting bus. The invention is specifically concerned with harmonizing a multiplicity of independent static inverters in supplying power to a common load wherein each inverter shares equally in supplying power to the load and is synchronized with the common load signal so that the circulation of currents between inverters is avoided.

It is common in many power applications to connect power sources in parallel to energize a load. The paralleling arrangement allows more flexibility in supplying the needed power to a particular load since additional power sources may readily be added as the need arises. The redundancy of the parallel connection of a plurality of power sources is a highly desirable feature where reliability is a significant factor. When a plurality of paralleled power sources supply an ac signal to the common load it is necessary that they be harmonized with each other so that each power source shares equally in supplying the load. Should the power sources fall out of harmony, one of the sources may be called upon to supply power greatly in excess of its rated capacity. In addition, circulating currents may develop which will flow from one power source to another power source. These undesirable effects may cause one of the power sources to fail. It is desirable, therefore, to harmonize these power sources so that each power source contributes equally to the load.

Dynamic inverters comprising rotating machinery such as alternators, when connected in parallel to a common bus load, have an intrinsic ability to lock together in frequency. Dynamic inverters possess this intrinsic ability because the circulating real component of their output current tends to motorize the slower alternator and load down the faster alternator. Should these alternators pull apart in phase and fall out of synchronism, a circulating current between the two builds up to a point at which the counteracting motorizing effect and loading effect draws the two alternators back into synchronism again.

In many recent power applications, however, solid state type static inverters are replacing dynamic inverters. Solid state type static inverters have the advantage of being more reliable, requiring less maintenance, having less weight and being more efficient than dynamic inverters. However, the static inverters have no intrinsic tendency to lock into synchronization with each other when connected in parallel to a common load. Should static inverters fall out of synchronism with each other, it is possible for a very large circulating current between the inverters to be generated. These currents can be large enough to destroy the inverter or cause protective devices to operate and hence cause the failure of the entire power system.

At present one method of preventing parallel connected inverters from falling out of synchronism is to use a master oscillator or reference frequency source to establish a system frequency and furnish drive signals to separately excite the inverter circuits in synchronism. This solution, however, may reduce the reliability of the inverter system since a failure of the master oscillator may cause the entire power system to fail. This adversely affects reliability since the inverters are not independent of each other. A more general solution to the problem of paralleling inverters is to cross-couple the load voltages of the inverters with each other. This solution is analogous to synchronizing oscillators by cross-coupling the oscillator outputs with the resonant circuits of the other oscillators. This system, too, is undesirable, however, since it requires the matching of the resonant circuits of the inverters and does not permit the inverters to operate independently of each other.

It is therefore an object of the invention to operate parallel connected inverters in synchronism with each other.

It is also an object of the invention to allow each static inverter in a parallel arrangement of static inverters to run freely and independently of the other static inverters.

It is another object of the invention to synchronize parallel connected inverters without the necessity of cross-connections between the inverters.

It is yet another object of the invention to control the phase relationship between parallel connected static inverters so that the alternating outputs of the inverters are in synchronism with the common output signal.

It is still another object of the invention to synchronize the frequency and regulate the magnitude of the output signal of a static inverter in harmony with other static inverters without a common control circuit.

It is yet another object of the invention to eliminate control lead connections between parallel connected static inverters.

It is still another object to eliminate circulating currents between parallel connected static inverters.

BRIEF SUMMARY OF THE INVENTION

In accord with the present invention each static inverter of a plurality of static inverters connected in parallel to a common output bus includes a feedback arrangement to regulate the magnitude and synchronize the frequency of the power outputs of each of the static inverters with a common power signal on a bus line. Each individual static inverter is driven by an independent voltage controlled oscillator. The output of the voltage controlled oscillator is modified in response to feedback correction signals derived from deviations of the voltage magnitude and frequency of the inverter output signal from the bus signal. The real and reactive components of the inverter output current applied to the common bus are detected and negative current feedback signals derived therefrom. Negative voltage feedback signals are derived which are representative of the bus voltage and frequency. These signals are combined by summing networks and the resultant feedback signals multiplied by sinusoidal functions of the output impedance phase angle to develop appropriate correction signals with which to control the magnitude and frequency of the inverter output signal. The sinusoidal multiplying factors bring the output current of the inverter into an orthogonal relationship with the bus signal. This advantageously causes the output impedance of the inverter to appear resistive. This eliminates operational variations in the response of the parallel connected inverters to changes in the bus voltage and frequency.

A feature of the present invention is that the common output voltages supplied to the bus by the parallel inverters are individually frequency and voltage regulated. The real and reactive components of the output current delivered by each of the static inverters to the common bus is regulated by a feedback network so that the load supplied to the bus by each individual inverter is equally shared with the other inverters. The control method described does not rely on any common control circuit interconnecting the parallel system of inverters, thereby improving the reliability of the power system.

BRIEF DESCRIPTION OF THE DRAWINGS

The principles and operation of the present invention may be understood with reference to the following detailed description and accompanying drawings in which:

FIGS. 3A and 3B, combined as shown in FIG. 3C, comprise a combined schematic and block diagram of a static inverter including current and voltage negative feedback controls to harmonize the inverter output signal with a common bus signal.

DETAILED DESCRIPTION

Figures 1, 2:
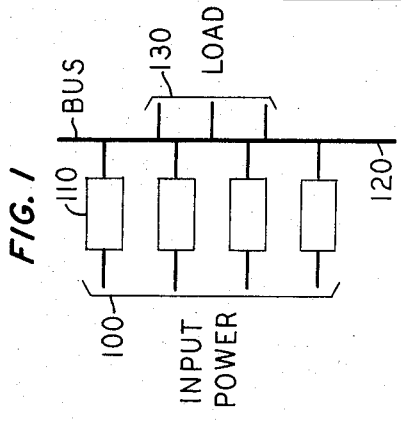
FIG. 1 is a block diagram showing a plurality of inverters connected to a common bus.
FIG. 2 is a block diagram of a static inverter suitable for connection to a common bus in parallel with other static inverters.

A power system comprising parallel static inverters as shown in FIG. 1 offers many advantages as a power supply system. The power supply system illustrated in FIG. 1 comprises a plurality of sources of input energizing power 100 which are individual to each of the inverter circuits 110. The inverter circuits 110 are all connected in parallel to a common bus line 120. A load or loads 130 may be coupled to the bus line. Each of the inverter circuits 110 can operate independently and has only its output terminals common to the rest of the system. According to the principles of the invention, the inverter circuits 110 control their own frequency and regulate their output to harmonize with the common output signal on the bus line 120 so that no master control circuit common to all the inverters is necessary.

Paralleled static inverter power systems containing independent units synchronized with each other are very flexible and permit the addition of new inverter units to supply more power to satisfy increasing load demands. Such an arrangement permits low initial cost in developing a system which readily grows in response to increasing demand. Paralleled static inverter power systems with independent units provide increased reliability because of the redundancy of the independent inverter units.

The inverter circuit 210, shown in FIG. 2, has an internal feedback control circuit to permit the parallel operation of the inverter with a plurality of other inverters connected in parallel to a common bus 220. The internal feedback control system encompasses the output lead 221 in order to control the magnitude, phase and frequency of the inverter output to maintain it in harmony with the common output signal of a plurality of inverters connected in parallel to the common bus 220 without requiring any interconnections between the inverters. The combined signal outputs of the parallel connected inverters are harmonized so that the load currents applied to the load connected to the bus 220 will be equally shared by all of the inverters and circulating currents between the inverters will be minimized. The frequency of operation of each of the inverters 210 will lock to the common frequency of the output signal on the bus 220.

Each static inverter 210 includes its own independent energy source which, as shown in the illustrative embodiment in FIG. 2, comprises the precision frequency source 200. The precision frequency source 200 is preferably a precision oscillator which establishes a fairly constant reference value of frequency much higher than the desired output frequency of the inverter. The output of the frequency source 200 is applied to a frequency divider and phase shifter circuit which is responsive to the feedback input signal applied at input lead 231. The frequency divider and phase shifter 201 is used to modify the frequency and phase displacement of the signal output of the frequency source 200 to correspond to the common signal on the bus 220. While many different types of frequency sources, frequency dividers and phase shifters may be used the practices of the invention are most advantageously performed using digital techniques. Accordingly, a frequency source 200 using switching devices may be used to generate a signal digital in character. Digital circuitry may then be used to perform the frequency division and phase shifting functions.

The output of the frequency divider and phase shifter 201 is applied to a summing circuit 209. A feedback signal applied to input 239 of the summing circuit 209 adjusts the output of the frequency divider and phase shifter 201 to regulate the magnitude of the output signal of the inverter. The output of the summing circuit 209 is applied to an amplifying circuit 202 and from thence to a filter circuit 203. The filter 203 is tuned to the desired frequency of the common signal on the bus 220 and in addition controls the phase angle Φ of the output impedance of the inverter. In digital type inverters the filter 203 may be utilized to convert a periodic digital signal to a periodic sinusoidal function. The filter 203 is connected to a current sensing circuit 204 which measures the real and the reactive components of the output current of the inverter. The real and reactive components of the output current are defined as the components of the output current in phase and in quadrature with respect to the signal output of the frequency source 200. In a digital type inverter the measurement of the real and reactive components of the output current is performed by sampling techniques. A sinusoidal weighting factor is applied to the feedback signals as described below. In response to the weighting factor the real component of the output current is a linear function of the signal voltage of the bus and the reactive component of the output current is a linear function of the frequency of the signal. The current sensing circuit 204 applies a signal proportional to the reactive component of the output current to a summing circuit 208, via lead 233, and a signal proportional to the real component of the output current to summing circuit 207, via lead 234.

A voltage comparator 205 compares the output voltage of the inverter applied to the bus 220 with a reference voltage generated by a reference voltage source 206. The comparator 205 generates an error voltage signal therefrom, which is applied to the summing circuit 207 where it is combined with the signal proportional to the real component of the inverter output current measured by the current sensing circuit 204. The summing circuit 207 combines these two signal and applies the sum thereof to the cosine multiplying circuit 213. The cosine multiplying circuit 213 modifies the feedback signal by a weighting factor which is equal to the cosine of the output impedance phase angle Φ of the inverter. The weighting factors are sinusoidal functions of the inverter's output impedance phase angle Φ and are applied to the feedback signals to achieve orthogonality between the real and reactive components of the output current and the magnitude and frequency of the common output signal on the bus 220.

A signal proportional to the reactive component of the output current detected by the current sensing circuit 204 is applied, via lead 233, to the summing circuit 208. The summing circuit 208 combines this signal with the output of the summing circuit 212 and applies it to the sine multiplying circuit 214. The sinusoidal multiplying circuit 214 modifies this signal by a negative weighting factor equal to the sine of the output impedance phase angle Φ of the inverter. The outputs of the cosine multiplying circuit 213 and the sine multiplying circuit 214 are combined by the summing circuit 211. The signal output of the summing circuit 211 is used as a voltage magnitude correcting signal which applied, via lead 239, to the summing circuit 209 alters the magnitude of the output of the frequency divider and the phase shifter 201.

The measured components of the output current are also utilized to derive a frequency correction signal. A signal proportional to the reactive component of the output current on lead 233 is applied to a cosine multiplying circuit 215. The output of the summing circuit 207 described above is also applied to a sine multiplying circuit 216. The outputs of the cosine multiplying circuit 215 and the sine multiplying circuit 216 are combined in the summing circuit 212. The signal is applied, via lead 231, to the frequency divider and phase shifter 201 and serves to control modification of the frequency of the output of the frequency source 200.

The above described weighting and summing operations applied to the detected output signals generate the necessary feedback correction signals to bring the magnitude and frequency of the inverter output into agreement with the common output signal appearing on the bus 220. The feedback correcting signals described above are defined by the following equations which describe the behavior of the feedback control system of the inverter illustrated in FIG. 2. These feedback control signals specifically bring the inverter signals into an orthogonal relationship with the output signal on the bus 220. The voltage magnitude $e_g$ and frequency correction $f_g$ signals are given by:

$$e_g = -\left\{ [\mu_1 e_b + k_1 i_d] (\cos \Phi) + \left[\frac{f_n}{k_3} + k_2 i_q\right] (-\sin \Phi) \right\} \quad (1)$$

$$f_g = -k_3 \{ [k_2 i_q \cos \Phi] + [\mu_1 e_b + k_1 i_d] (\sin \Phi) \}. \quad (2)$$

Where
$e_e$ is the feedback signal utilized to modify the magnitude of the inverter output signal.

$f_e$ is the feedback signal utilized to modify the frequency of the inverter output signal.

$i_d$ is the component of the output current of the inverter in phase with the signal generated by the frequency source 200.

$i_q$ is the component of the output current of the inverter in quadrature phase relationship with the signal generated by the frequency source 200.

$\Phi$ is the phase signal of the output impedance of the inverter.

$\mu$; $k_1$; $k_2$; $k_3$ represent the gain existing in the various feedback circuit paths.

The in-phase and quadrature components of the output current are described by the relations:

$$i_d = \frac{1}{z}\left\{\Delta e \cos \Phi + E\left[\int \Delta f \, dt\right] \sin \Phi\right\} \quad (3)$$

$$i_q = \frac{1}{z}\left\{E\left[\int \Delta f \, dt\right] \cos \Phi = \Delta e \sin \Phi\right\}. \quad (4)$$

Where
$E$ is the magnitude of the output voltage of the frequency source 200.

$\Delta e$ is the difference between the inverter voltage and the bus voltage.

$\Delta f$ is the difference between the inverter frequency and the bus frequency.

It is apparent from the above equations describing the behavior of the feedback control system that the sinusoidal multiplying factors, which are functions of the output impedance phase angle $\Phi$ of the inverter, generate control signals which alter the inverter output to achieve orthogonality of the real and reactive inverter output currents with the voltage and frequency of the common signal of the bus 220. This advantageously permits the inverter to be connected and operate into load impedances with arbitrary impedance angles.

Figure 3B:
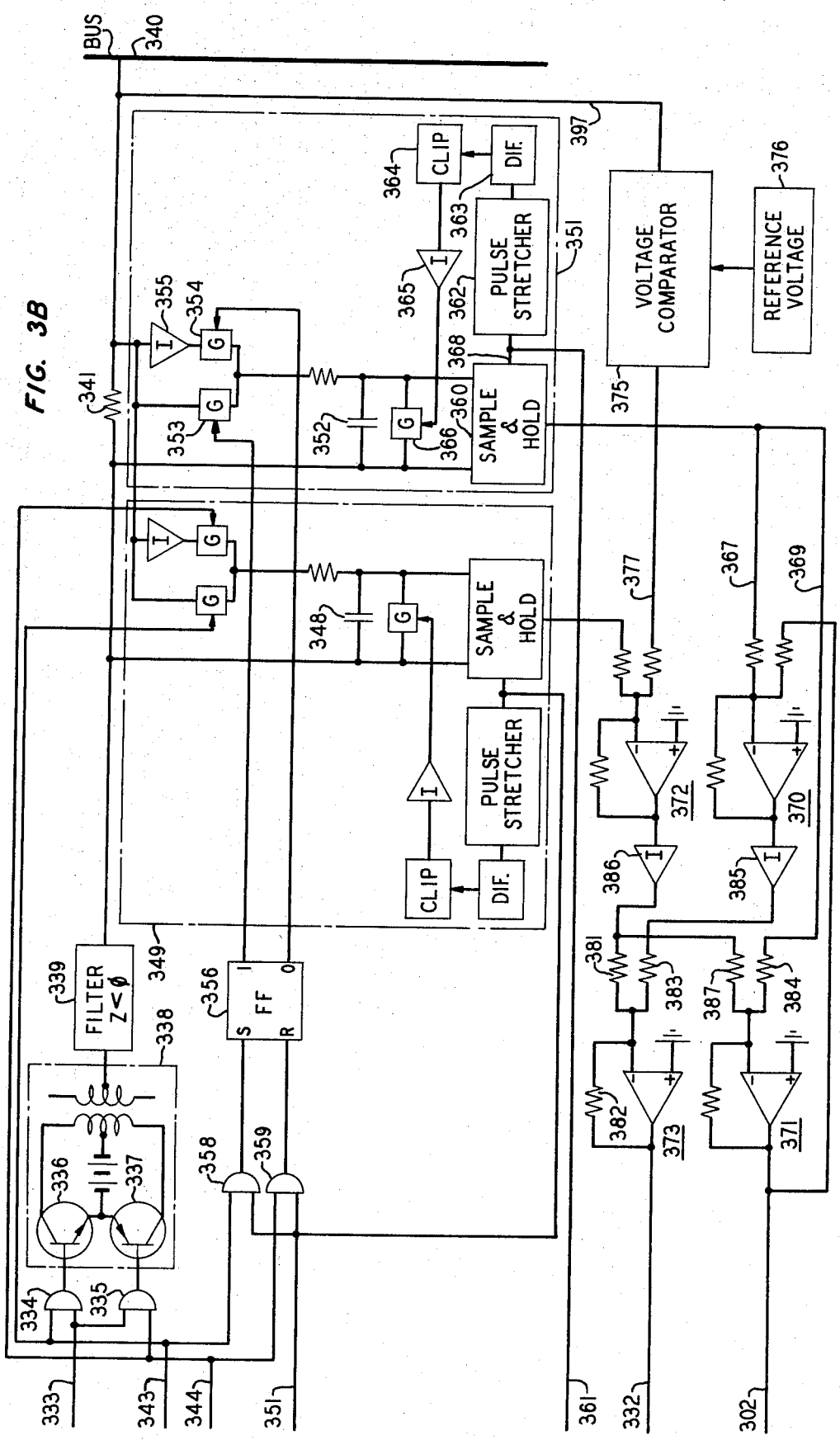
Figure 4A:
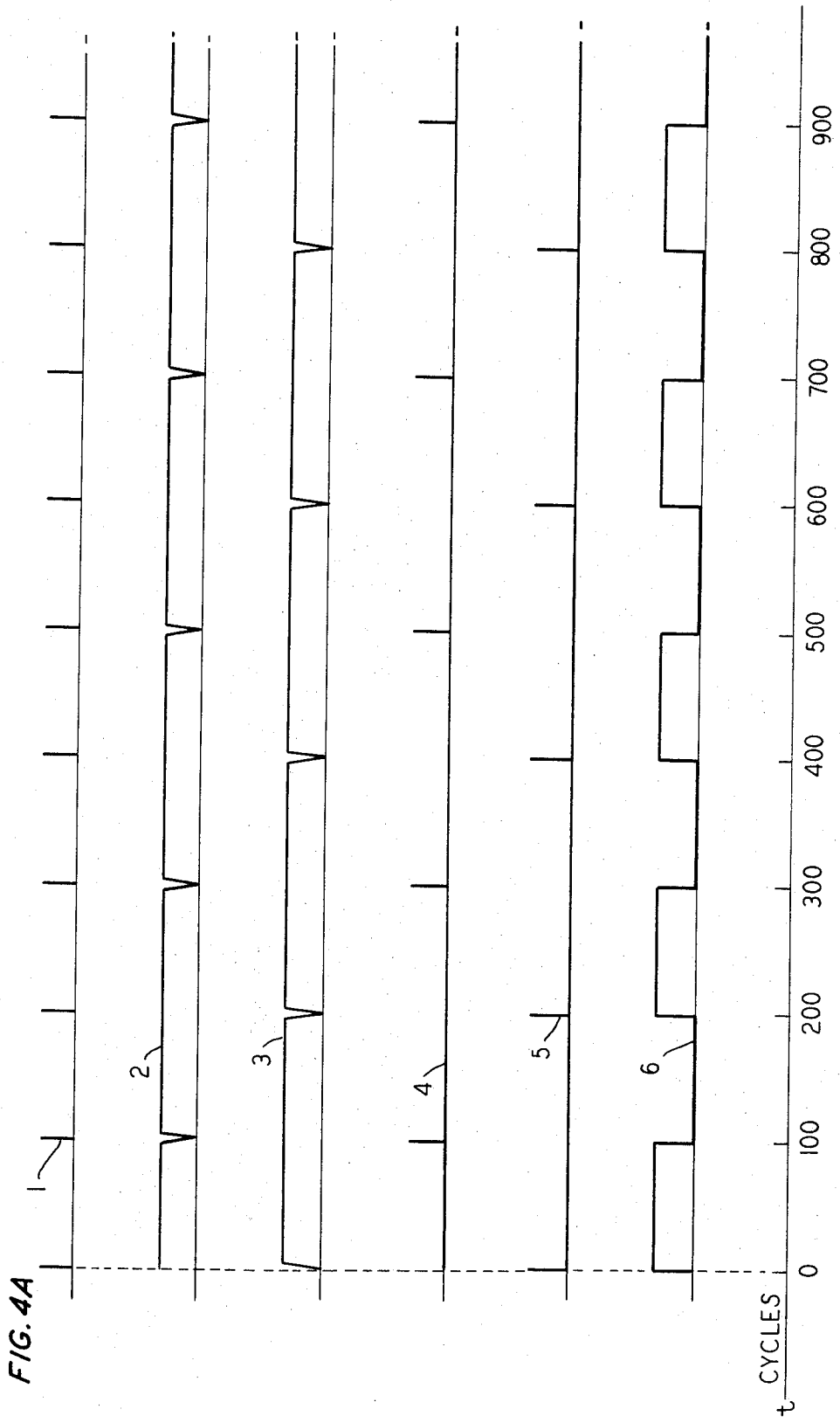
FIGS. 4a–4c shows voltage waveforms of the internal inverter signals to assist in describing the operation of the static inverter disclosed in FIGS. 3A and 3B.
Figure 4B:
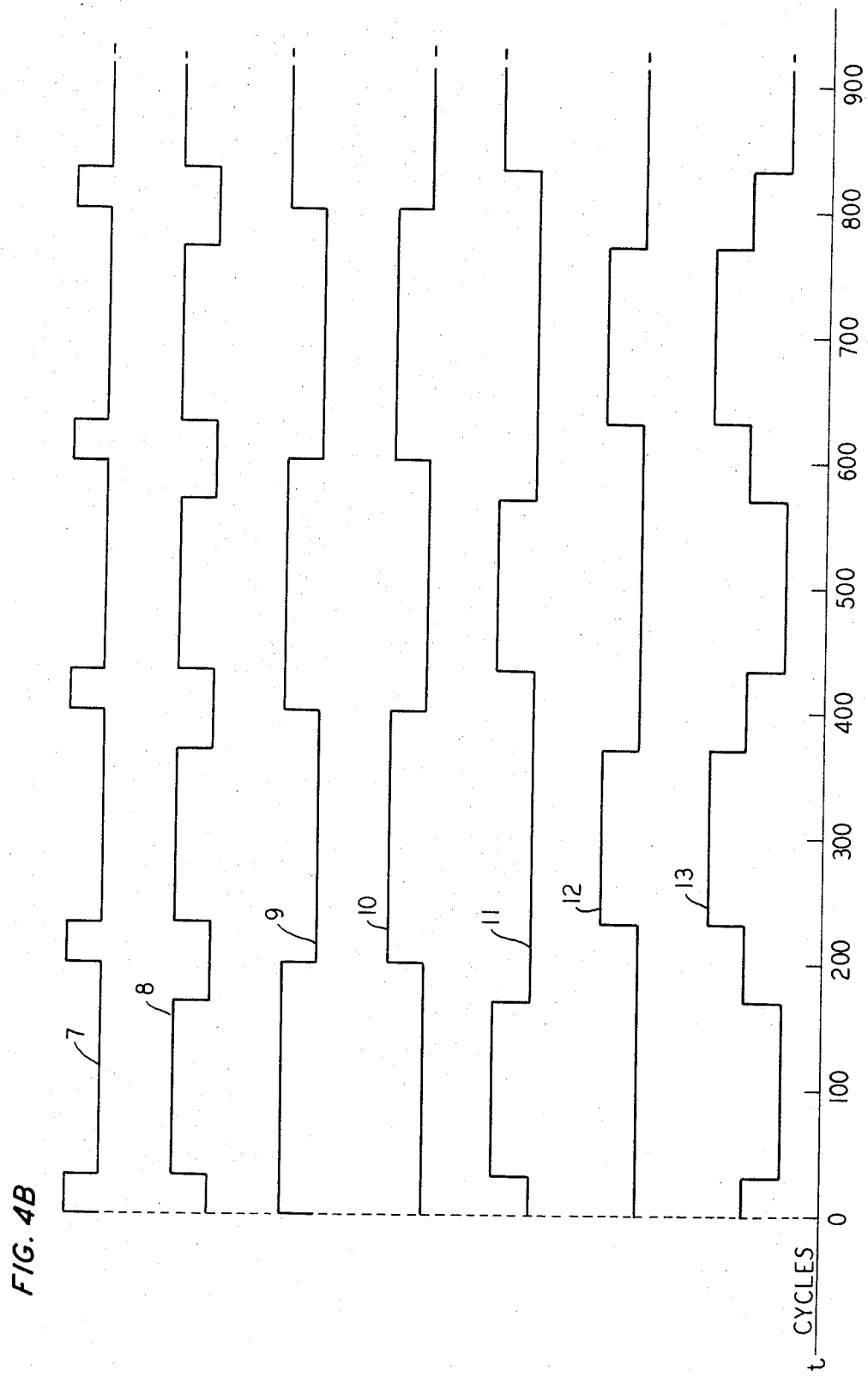
Figure 4C:
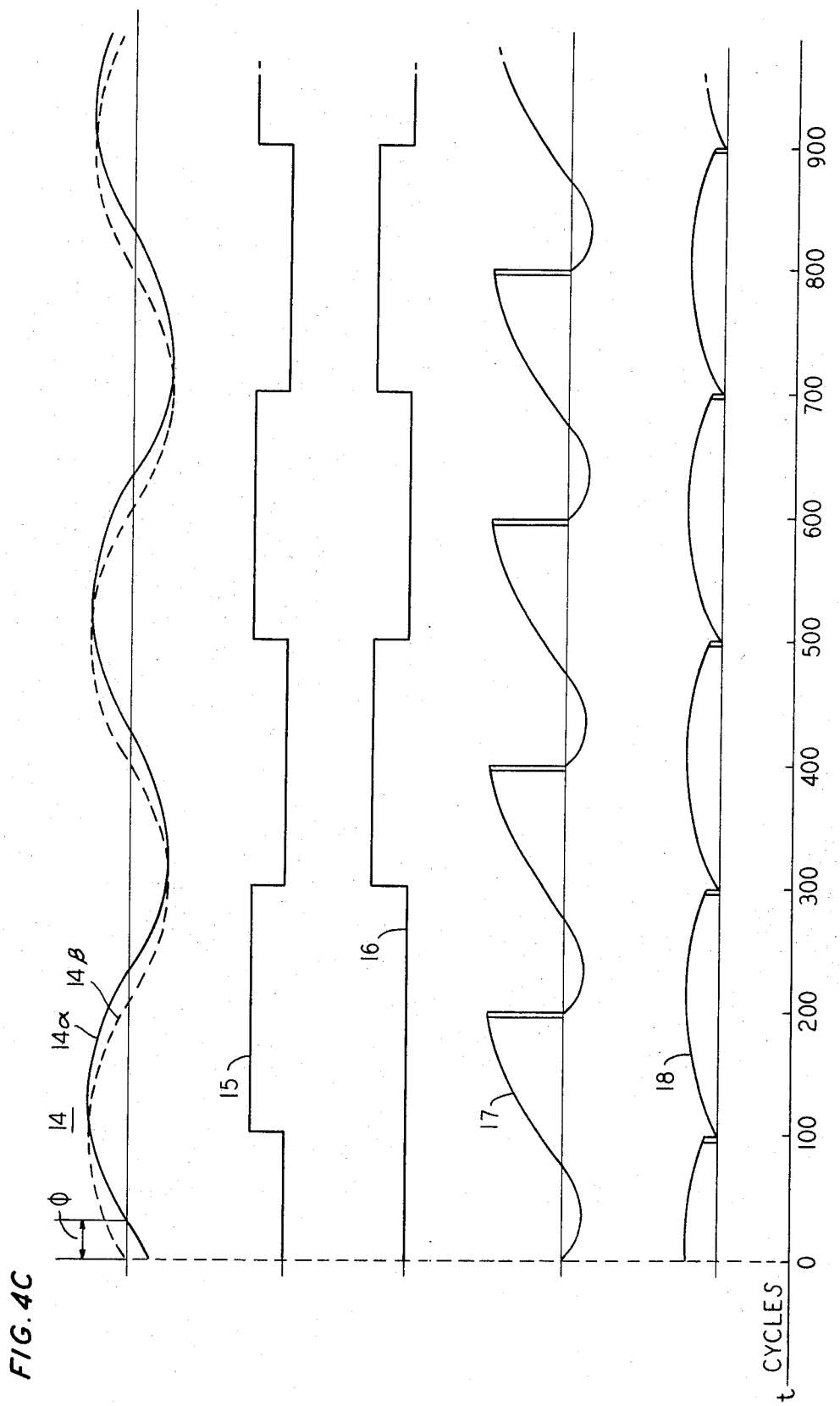

The inverter circuit disclosed in FIG. 2 may be constructed utilizing linear devices and analog-type feedback control circuits. A more suitable inverter construction practices the invention utilizing digital techniques. The signal generation and feedback control arrangements in the inverter circuit shown in FIG. 3 utilize digital control techniques. A digital type feedback arrangement controls the digital type signal generation circuitry to control the output signal in response to sampling of the real and reactive components of the current output of the inverter. A digitally controlled static inverter circuit embodying the principles of the invention is disclosed in FIGS. 3A and 3B combined as shown in FIG. 3C. A series of waveforms shown in FIGS. 4A, 4B and 4C illustrate the current and voltage waveforms occurring internally to the inverter circuit shown in FIGS. 3A and 3B.

The inverter disclosed in FIG. 3 is energized by a voltage controlled oscillator 301. The voltage controlled oscillator 301 establishes the output frequency of the inverter circuit and includes a frequency control input lead 302 which is utilized to apply a frequency control signal. The voltage controlled oscillator 301 generates a periodic pulse signal in the illustrative embodiment. It is to be understood that other waveforms may be generated by the voltage controlled oscillator without departing from the spirit and scope of the invention. The magnitude of the frequency control signal applied to lead 302 controls the frequency of the output signal of the voltage controlled oscillator applied to lead 303. The output of the voltage controlled oscillator on lead 303 is partially depicted by waveform 1 in FIG. 4A. For illustrative purposes, it is assumed that the frequency of the voltage controlled oscillator 301 is 24,000 Hz. The timing scale $t$ associated with the waveforms in FIGS. 4A, 4B and 4C is marked to show the occurrence of every 100 cycles. The output of the voltage controlled oscillator 301 on lead 303, as shown in waveform 1, has timing marks to mark the output of the oscillator at every 100 cycles.

The output of the voltage controlled oscillator on lead 303 is coupled to a bidirectional counter circuit 305, via the AND gates 304 and 308. The bidirectional counter 305 has two separate input leads 306 and 307 corresponding to each direction of counting. Pulse signals applied to the up count input lead 306 will cause the counter to register an increasing count upon the receipt of each input pulse. Input pulse signals applied to the down count input lead 307 will cause the counter to decrease its registered count upon the receipt of every input pulse. Bidirectional counters such as the counter 305 are well known in the art and it is not believed necessary to describe it in detail. The alternate conductive states of the AND gates 304 and 308 determine to which counter input the output of the voltage controlled oscillator is applied.

The alternate conductivity of the AND gates 304 and 308 is determined by the output signal state of a toggle flip-flop circuit 309. Toggle flip-flops are well known in the art and a detailed description thereof is not believed necessary. With the output signal state of the flip-flop circuit 309 as indicated in the drawings, an output representative of a one logic state occurs on lead 310. This one output state enables the transmission of the signal output of the voltage controlled oscillator 301 through the AND gate 304 to the up count input lead 306 of the counter 305. Hence at this instant, the counter 305 is counting in an upward direction or increasing its count in response to the output pulses of the voltage controlled oscillator 301.

The output of the counter 305, which represents the existing internal count therein is applied simultaneously to two logic circuits 311 and 312. The logic circuits 311 and 312 are count responsive circuits designed to be responsive to a particular existing count registered by the counter 305. The output of the logic circuit 311 normally assumes a state representative of a one except when a certain count $n$ is registered in the counter 305. The output of logic circuit 311 assumes a zero state in response to the count $n$. For the purposes of illustrating the operation of the invention, this value $n$ is assumed to be 100. The output of logic circuit 311 is shown by waveform 2. As is apparent from inspection of waveform 2, the output of the logic circuit 311 drops to a zero state every time the count of 100 occurs in the counter 305. The logic circuit 312 is designed to generate a one state output for every count registered in the counter 305 except the count of zero. When the count zero occurs, the output of logic circuit 312 drops to a zero state. The output signal of the logic circuit 312 is shown by waveform 3 in FIG. 4A. The logic circuits 311 and 312 may comprise gate arrangements which transmit only in response to particular count signal inputs.

The output signal of the logic circuit 311 is applied to the signal polarity inverter 313. Similarly, the output of the logic circuit 312 is applied to the signal polarity inverter 317. It is apparent that a one state signal appears at the output of inverters 313 and 317 at the counts of 100 and 0, respectively. The signal output of inverters 313 and 317 are shown by waveforms 4 and 5, respectively, in FIG. 4A.

The one state output signal of the inverter 313 at count 100 is applied, via the OR gate 314, to the toggle input lead 315 of the toggle flip-flop circuit 309. The toggle flip-flop 309, in response to this one state input signal, inverts its output signal so that the one and zero states are reversed from the illustrated output states shown in FIG. 3A. This places a one state output signal on the output lead 316 of the toggle flip-flop 309 and a zero state output signal on output lead 310 as shown by waveform 6 in FIG. 4A.

The one state signal on lead 316 enables transmission of the pulse output of the voltage controlled oscillator 301 through the AND gate 308 to the down count input lead 307 of the counter 305. Since the toggle signal input to the toggle input lead 315 occurred at the output of the count of 100 of the counter 305, the counter 305 now begins to count down from the value of 100. The count of the counter 305 continues to decrease until the value of zero is reached. At the count of zero the logic circuit 312 responds by producing a zero state output signal. This zero state output signal is inverted by the inverter 317 to a one state value which is applied, via OR gate 314, to the toggle input 315 of the flip-flop 309. The output of the flip-flop 309 changes state and enables the transmission of pulses to the up count input lead by enabling AND gate 304. The bidirectional counter 305 continuously counts up to 100 and back down to zero and subsequently up to 100 continuously in response to the feedback signals generated by the logic circuits 311 and 312.

The counting cycle from a zero count to the next zero count establishes the half-cycle duration of the static inverter output signal. The output of the signal polarity inverter 317 is a pulse signal which periodically occurs coincident with the beginning of each half-cycle of the static inverter output. This is the instant at which the counter 305 begins counting in an upward direction. The output of the signal polarity inverter 313 is a periodic pulse signal which corresponds to the midpoint of each half-cycle of the static inverter output. At this instant the counter 305 begins counting in a downward direction. These two signals, as will be described subsequently, are utilized to control the sampling of the output signal of the converter.

The output of the voltage controlled oscillator 301 is also applied, via lead 320, to the AND gates 321 and 322, and from thence to the up and down counter inputs of the bidirectional counter 323, respectively. The bidirectional counter 323 is an up and down counter and is identical in design to the bidirectional counter 305 described hereinabove. The counter 323 performs a memory function in the magnitude control of the inverter output by inserting symmetrical dead time periods at the beginning and end of each half-cycle of the pulse output signal as described hereinbelow.

The count output of both the counters 305 and 323 is applied to a logic circuit 324, which compares the respective counts contained in the two counters. The logic circuit 324 is designed to generate an output signal representative of a one state whenever the count in counter 305 exceeds the count in counter 323. The output of the logic circuit 324, shown by waveform 8 in FIG. 4B, is applied, via lead 326 and the inverter 327, to the AND gate 322.

The output of the above described signal polarity inverter 317 is applied, via lead 328, to an input of the pulse width modulator 329. The pulse width modulator 329 is activated by a feedback magnitude correction signal on input lead 332 to generate a dead time pulse signal to control the magnitude of the static inverter output. The pulse width modulator 329 generates a pulse signal whose leading edge is coincident with the leading edge of the output pulse of the inverter 317 and whose pulse duration is proportional to the magnitude of the feedback signal applied to lead 332. Modulated pulse generating circuits performing these functions are well known in the art and a detailed description thereof is not believed necessary.

The modulated pulse output of the pulse width modulator, shown by waveform 7 in FIG. 4B, is connected, via the signal polarity inverter 330, to the AND gate 322, and via lead 331 to the AND gate 321. The counter 323, the pulse width modulator 329 and the associated logic circuitry just described function as a magnitude control to control the magnitude of the output waveform of the static inverter without disturbing its phase relationship with the common bus signal. It accomplishes this function without affecting the phase by pulse width modulating the output pulse signals symmetrically so that equal dead times are introduced in exactly equal amounts at the beginning and at the end of each half-cycle of the output of the voltage controlled oscillator 301.

The magnitude control circuitry may be best understood by describing its operation. At the start of each upward counting cycle of the bidirectional counter 305 a dead time pulse having a one state value and a duration proportional to the magnitude of the static inverter output signal is generated by the pulse width modulator 329. The pulse width modulator 329 begins timing the pulse signal duration to establish the dead time interval in response to the leading edge of the output pulse signal of the signal polarity inverter 317, which is applied, via lead 328, to the input of the pulse width modulator 329. The output of inverter 317 is coincident with the beginning of the upward counting action in counter 305.

The duration of the pulse signal output of modulator 329 is determined by a magnitude control signal generated by the feedback voltage regulation control to be described subsequently. This control signal is applied to the input 332 of the pulse width modulator 329. During this initial dead time interval the pulse output of the pulse width modulator 329, represented by waveform 7 in FIG. 4B, is applied, via lead 331, to the AND gate 321. This pulse signal enables transmission through the AND gate 321 and the application of the pulse output of the voltage controlled oscillator 301 to the up counting terminal of the bidirectional counter 323.

During the duration of the pulse signal determining the dead time interval, as shown by waveform 7, the counter 323 counts up in synchronism with the up count occurring simultaneously in counter 305. At the termination of the dead time interval the output of the pulse width modulator 329 changes to a zero state value and transmission through the AND gate 321 is disabled. The signal polarity inverter 330 inverts this zero state signal to a one state signal value and applies an enabling signal to the AND gate 322. AND gate 322 requires two simultaneous enabling signals in order to transmit and at this time does not apply the pulse output of the voltage controlled oscillator 301 to the down count input lead of the counter 323. The second enabling signal to AND gate 322 is supplied by the logic circuit 324. At this point in time, however, the output of logic circuit 324 has a one state value and the AND gate 322 cannot transmit signals.

The logic circuit 324 is a count comparison circuit which continuously compares the respective counts existing in the bidirectional counters 305 and 323. When the count in counter 305 exceeds the counter 323, the output of the logic circuit 324 assumes a one state value as shown by waveform 8 in FIG. 4B. This one state value signal is applied to an inverter 327. It is apparent from the foregoing that during the initial dead time interval and the time interval when the count in counter 305 exceeds the count in counter 323, a zero state value signal is applied, via lead 331 and signal polarity inverter 327, to the AND gate 321 and 322 in order to disable transmission therethrough.

During the time period that the output of logic circuit 324 assumes a one state value, the counter 323, having all its inputs isolated from input signals, becomes inactive. During the inactive interval of counter 323, the counter 305 continues to count up, reaches its high value, and begins to count down. Eventually the count in counter 305 reaches the count value previously achieved and stored in counter 323, and the logic circuit 324 in response to this comparison generates a zero state signal. This signal is applied, via lead 326 and the signal polarity inverter 327, to AND gate 322 and in combination with the one state signal output of the signal polarity inverter 330 enables signal transmission through the AND gate 322. The counter 323 resumes counting in a downward direction and counts to its zero value. The interval during which the counter 323 counts downward establishes the dead time interval at the end of the half-cycle of the static inverter output signal.

The output signal of the static inverter applied to the bus 340 is derived from the signal output of the logic circuit 324. The signal output, shown by waveform 8 in FIG. 4B, is applied, via lead 333, to the two AND gates 334 and 335. The outputs of AND gates 334 and 335 are connected to the control electrodes of the switching transistors 336 and 337, respectively, which are included in the push-pull switching circuit 338. The transistors 336 and 337 are alternately switched into conducting states in response to the toggle flip-flop 342 signal output as described below. The alternating output signal of the push-pull switching circuit 338, shown by waveform 13 in FIG. 4B, is applied to a filter circuit 339 which establishes the magnitude and phase angle of the output impedance of the static inverter. The output of the filter circuit 339 is connected, via the current sensing resistor 341, to the bus 340. The filter circuit 339 is tuned to the desired frequency of the output signal on the bus 340 and converts the input pulse signal to a sinusoidal signal as shown by waveform 14 in FIG. 4C.

It is apparent from the foregoing that by utilizing the signal output of the logic circuit 324 the squarewave signal applied to the filter circuit 339 has equal dead time intervals occurring both at the beginning and at the end of each half-cycle and hence is symmetrical about the midpoint of each half-cycle. Hence, changes in the magnitude of the output signal will not effect the respective phase of this signal with the common output signal on the bus 340.

The alternate switching of the switching transistors 336 and 337 is controlled in response to the signal output of the flip-flop 342. The flip-flop 342 is a toggle flip-flop circuit which is triggered into alternate output signal states in response to the pulse output of the signal polarity inverter 317 applied to its toggle input lead. The two outputs of the flip-flop 342 on leads 343 and 344 are represented respectively by waveforms 9 and 10 in FIG. 4B. The output lead 343 of the flip-flop is connected to the AND gate 334 and the output lead 344 is connected to the AND gate 335. Hence, it is apparent that the output of the flip-flop 342 will alternately enable the AND gates 334 and 335 and permit the output of the logic circuit to alternately bias the switching transistors 336 and 337 into a conducting state.

The magnitude and frequency of the static inverter output signal is continuously controlled in response to an output signal regulation feedback system which monitors the current and voltage of the output signal. The output signal applied to the bus 340 is transmitted via a current sensing resistor 341. In the illustrative embodiment the output signal, shown by waveform 14α in FIG. 4C, is a sinusoidal function which is out of phase with the signal generated in response to the voltage controlled oscillator 301 and appearing at the input to filter 339 by the output impedance phase angle Φ determined by the filter 339. A sinusoid in phase with the input to the filter 339 is shown by the dotted waveform 14β in FIG. 4C. It is to be understood that the invention will function equally as well with other waveshapes and that the signal output is not limited to a sinusoidal function.

The feedback circuitry to regulate the output signal generates the feedback signals by sampling the components of the sinusoidal output current which are in phase and in quadrature with the input signal to filter 339 generated in response to the voltage controlled oscillator 301. Separate output current sensing circuits are utilized to detect the in phase or direct components and the reactive or quadrature components of the output signal. These detecting circuits integrate the voltage signal occurring across the current sensing resistor 341 and sample this integrated signal to determine the direct and quadrature signal components. The direct component is determined by the detecting circuit 349; the quadrature component is determined by the detecting circuit 351. The two detecting circuits 349 and 351 are essentially equivalent and hence the operation of only one of these circuits will be described in detail.

The quadrature detecting circuit 351 includes an integrating capacitor 352 which is shunted across the current sensing resistor 341. The voltage signal across the resistor 341 is periodically sampled in response to the periodic closing of the gate circuits 353 and 354. The gate circuits 353 and 354 are synchronized to close in quadrature with the input signal to the filter 339. The gate circuit 353 is closed during the positive half-cycle of the output signal. A signal polarity inverter circuit 355 inverts the signal polarity of the signal transmitted by the gate circuit 354 during the negative half-cycle of the output signal so that the output signal samples integrated by capacitor 352 are always of the same polarity.

The gate circuits 353 and 354 are controlled in response to the output signals of the set-clear type flip-flop circuit 356. The output signals of the flip-flop 356 are controlled in response to the signal outputs of the toggle flip-flop 342 and the signal output of the signal polarity inverter 313. The signal output of the inverter 313 is coupled, via the lead 357, to the parallel connected AND gates 358 and 359. These set and reset signals are alternately applied by the alternately enabled AND gates 358 and 359 to the set and reset inputs of flip-flop 356.

The signal output of the toggle flip-flop 342 is connected, via lead 343, to enable AND gate 358 and via lead 344 to enable AND gate 359. It is apparent from the foregoing that the AND gates 358 and 359 are alternately enabled to permit the output of the inverter 313 to switch the flip-flop 356 from its one output state to its other output state. The gate circuits 353 and 354 are alternately enabled as described above to apply the voltage across resistor 341 to the capacitor 352. Because of the action of inverter 355 the voltage across capacitor 352, as shown by waveform 18 in FIG. 4C, is of a single polarity. The gate circuits 353 and 354 may comprise any controllable signal transmission device which is capable of transmitting a signal without impairing its amplitude characteristics.

The voltage across the capacitor 352 is applied to a sample and hold circuit 360. The sample and hold circuit 360 measures the voltage amplitude across the capacitor 352 for a short duration, $T_a$, shown with waveform 18 in FIG. 4C. The moment at which the measurement takes place is determined by the pulse output of the signal polarity inverter 313. The output of inverter 313 is applied, via lead 361, to the sample control input 368. The sample and hold circuit 360 applies each measured sample of the voltage on capacitor 352 to the sinusoidal multiplying circuits 370 and 371, via leads 367 and 369, respectively. The sinusoidal multiplying circuits are operational amplifiers designed to apply a weighting factor to the feedback regulatory signals and are described hereinbelow.

The pulse signal output of the inverter 313 represented by waveform 4 in FIG. 4A is also utilized to discharge the capacitor 352 subsequent to each measured sample. The pulse signal activating the sample and hold circuit is also applied to a pulse stretcher 362. The pulse stretcher 362 extends the duration of the pulse output of inverter 313 sufficiently so that the trailing edge of the pulse occurs after the sample and hold circuit 360 has completed its sampling measurement. The output of the pulse stretcher 362 is applied to a differentiator 363 which produces positive and negative pulse spikes coincident with the leading and trailing edges of the pulse output of the pulse stretcher 362. The clipping circuit 364 blocks the transmission of the positive pulse spikes. The negative pulse spikes are inverted by the signal polarity inverter 365 applied to a discharge gate 366. The discharge gate 366 closes in response to the pulse output of inverter 365 and discharges the capacitor 352 following each sample measurement. The direct detecting circuit 349 applies the voltage across resistor 341 to the capacitor 348. This voltage is shown by waveform 17 in FIG. 4C. This voltage is sampled in response to the pulse output of the signal polarity inverter 317.

The sinusoidal multiplying circuits 371 and 373 which modify the feedback signals by sine and cosine weighting functions comprise high gain operational amplifiers. The sinusoidal weighting function of the operational amplifier is determined by the ratio of the magnitude of its feedback impedance to its input impedance. In the amplifier 373, for instance, the magnitude of the input impedance 381 and the magnitude of the feedback impedance 382 have resistance values in the ratio of the cosine trigonometric function of the output impedance phase angle Φ. The value of the ratio of the input impedance 383 to the feedback impedance 382 is the sine trigonometric function of the output impedance phase angle $\Phi$. The operational amplifier 373 performs the functions of the sinusoidal multiplying circuits 213 and 214 and the summing circuit 211 as illustrated in FIG. 2. The output of the operational amplifier circuit 373 is applied, via lead 332, to the pulse width modulator 329 and controls the magnitude of the static inverter output applied to the bus 340.

The operational amplifier 371 performs the functions of the sinusoidal multiplying circuits 215 and 216 and the summing circuit 212 as disclosed in FIG. 2. The output of operational amplifier 371 is applied to the voltage controlled oscillator 301 to control the frequency thereof. The operational amplifiers 370 and 372 perform the summing operation of the summing circuits 207 and 208 as disclosed in FIG. 2. These amplifiers apply no weighting factor to the summed signal and hence the feedback and input impedances are equal. The signal polarity inverters 385 and 386 are included to counteract the natural inverting characteristics of the operational amplifiers 370 and 372.

The magnitude of the output voltage at the bus 340 is monitored by a voltage comparator 375 which is coupled to the static inverter output, via lead 397. The voltage comparator 375 compares the output voltage with a reference voltage generated by the reference voltage source 376, and generates a voltage error signal therefrom. The voltage error signal is applied, via lead 377, to the operational amplifier 372 which sums it with the feedback signal from the detecting circuit 349 which is proportional to the direct component of the output current. The summed signal is applied to the input resistor 381 of the operational amplifier 373 which weights the summed signal by the cosine of the output impedance phase angle $\Phi$.

The output of the detecting circuit 351 as described above is applied to the operational amplifier 370 which performs a summing function and to the resistor 384 of operational amplifier 371 which weights it by the sine of the output impedance phase angle $\Phi$.

The output of the operational amplifier 372, as inverted by the inverter 386, is applied to resistor 387, of the operational amplifier 371 which weights it by the cosine of the output impedance phase angle $\Phi$. The output of the operational amplifier 371 is applied to the frequency control input 302 of the voltage controlled oscillator 301 to control the frequency thereof. This output is also applied to the operational amplifier 370 where it is summed with the output of the detecting circuit 351. The signal sum output of operational amplifier 370 is inverted by the signal polarity inverter 385 and applied to resistor 383 of operational amplifier 373 which weights it by the sine factor of the output impedance phase angle $\Phi$.

The interrelation of the above described operational amplifiers and their effect on the feedback signals may be readily ascertained by reference to the above equations (1) and (2) defining the feedback signals to control the magnitude and frequency of the signal output of the static inverter as applied to the bus 340.

What is claimed is:

1. A static inverter circuit to produce an output power signal in synchronism with a common signal $E_b$ on a bus terminal to which it is connected, comprising an oscillatory signal source, means responsive to deviations of the output signal of said static inverter from the voltage and frequency of the common signal $E_b$ on said bus terminal to generate control signals $\mu_1 e_b$ and $f_g/k_3$ respectively, means to derive signals $k_1 i_d$ and $k_2 i_q$ proportional to the real $i_d$ and reactive $i_q$ components of the inverter output current, means to combine said control signals and said proportional signals and means to multiply said combined signals by sinusoidal functions of the output impedance phase angle $\Phi$ of said static inverter in accord with the equations (A) and (B) to produce therefrom correction signals $e_g$ and $f_g$, means to utilize said correction signals to adjust the internal voltage and frequency of the output power signal of said static inverter so it corresponds with said common signal $E_b$ wherein equation (A) has the form $$e_g = -\left\{ [\mu_1 e_b + k_1 i_d] \ (\cos \Phi) + \left[\frac{f_g}{k_3} + k_2 i_q\right] (-\sin \Phi) \right\}$$

and equation (B) has the form $$f_g = -k3 \ \{ [k_2 i_q \cos \Phi] + [\mu_1 e_b + k_1 i_d] \ (\sin \Phi) \}$$

2. A static inverter circuit as defined in claim 1 wherein said means to utilize said correction signals comprises a first bidirectional counter and a second bidirectional counter coupled to the output of said oscillatory signal source and counting in response thereto, means to monitor the count in said first bidirectional counter including a first logic circuit responsive to the count $n$ and a second logic circuit responsive to the count 0 first feedback, means responsive to said first and second logic circuits to control the counting direction of said first bidirectional counter, means to control said second bidirectional counter including a third logic circuit responsive to the supremacy of the count in said first bidirectional counter over the count in said second bidirectional counter and second feedback means responsive to said third logic circuit to control the counting direction in said second bidirectional counter, and means to control the response of said second bidirectional counter to said oscillatory signal source according to the said correction signal $e_g$.

3. A static inverter circuit as defined in claim 2 wherein said means to derive signals $k_1 i_d$ and $k_2 i_q$ proportional to the real $i_d$ and reactive $i_q$ components of the inverter output current comprise means to sense said inverter output current, including signal storage means and gating means to couple components of the inverter output current to said signal storage means and means to time said gating means in order to sense the real $i_d$ and reactive $i_q$ components of the inverter output current.

4. A static inverter circuit as defined in claim 3 wherein said means to multiply comprises an operational amplifier with an input-to-feedback impedance ratio equal to the sinusoidal function of the angle of the inverter output impedance.

5. A static inverter comprising a voltage controlled oscillator having a frequency control input, means to divide the frequency of said voltage controlled oscillator, said means to divide including means to define the period of the static inverter output signal and means to define an interval symmetrical to each half-cycle of said period, means to derive a sinusoidal signal from the output of said means to divide, an output terminal, a current sensing device coupling said means to derive and said output terminal and including means to derive a direct and a quadrature signal proportional to the direct and quadrature currents flowing through said current sensing device, a reference voltage source, means to compare the magnitude of the voltage at said output with said reference voltage and generate an error signal therefrom, first and second cosine weighting means to weight signals by a factor equal to the cosine of the output impedance angle of said static inverter, first and second sine weighting means to weight signals by a factor equal to the sine of the output impedance angle of said static inverter, first means to sum said error signal and said direct signal, said first summing means having its output connected to said first cosine weighting means and said second cosine weighting means, second means to sum signals weighted by said first cosine and sine weighting means, third means to sum signals weighted by said second cosine and sine weighting means, fourth means to sum the output of said third summing means and said quadrature signal, said fourth summing means having its output connected to said first sine weighting means, said quadrature signal being applied to said second sine weighting means, the output of said third summing means being connected to the frequency control input of said voltage controlled oscillator and the output of said second summing means being connected to said means to define an interval symmetrical to each half-cycle of said period.

6. A static inverter as defined in claim 5 wherein said means to define the period comprises a first bidirectional counter connected to the output of said voltage controlled oscillator, means to synchronize counting action therein with the counting action in said first bidirectional counter and means to reverse the counting action therein at certain upper and lower count thresholds and said means to define the interval comprises a second bidirectional counter connected to the output of said voltage controlled oscillator, means to synchronize counting action therein with the counting action in said first bidirectional counter and means to inhibit counting in said second bidirectional counter for a time duration symmetrical to said upper count threshold, said means to inhibit responsive to the signal output of said second summing means whereby said time duration is responsive to the signal output of said second summing means.

7. A static inverter as defined in claim 6 wherein said means to derive a direct and a quadrature signal comprise direct signal energy storage means and quadrature signal energy storage means, gating means responsive to said means to divide to apply samples of the signal in said current sensing device to said direct signal energy storage means and said quadrature signal storage means in synchronism with the upper and lower count thresholds respectively.

8. The method of harmonizing a static inverter output signal with a signal on a common bus to which the static inverter is connected comprising the steps of:

generating a signal, detecting the real and reactive components of the output current of the static inverter output signal, generating a negative current feedback signal in response to said detected real and reactive components, detecting the common bus voltage and frequency and generating a negative voltage feedback signal therefrom, multiplying said feedback signal by weighting factors comprising sinusoidal functions of the output impedance phase angle of the static inverter, and utilizing said weighted negative current and voltage feedback signals to control the magnitude and frequency of said generated signal.

9. A method of harmonizing the signal output of a static inverter with the signal on a common bus to which the inverter is connected comprising the steps of:

generating a signal, determining the phase angle of the inverter output impedance phase angle, detecting the direct component of the static inverter current signal output and deriving a proportional signal therefrom, detecting the quadrature component of the static inverter current signal output and deriving a proportional signal therefrom, generating a reference signal voltage, detecting the output signal voltage of said static inverter, comparing said reference voltage with said output signal voltage and deriving an error voltage signal therefrom, summing said error voltage signal and said signal proportional to said direct component to derive a first correction signal, multiplying said first correction signal by a weighting factor equal to the cosine of the output impedance phase angle to derive a second correction signal, multiplying said signal proportional to said quadrature component by a weighting factor equal to the sine of the output impedance phase angle to derive a third correction signal, summing said second correction signal and said third correction signal to derive a fourth correction signal, utilizing said fourth correction signal to control the frequency of said generated signal, summing said fourth correction signal and said signal proportional to said quadrature component to derive a fifth correction signal, multiplying said fifth correction signal by a weighting factor equal to the sine of the output impedance phase angle to derive a sixth ocrrection signal, summing said sixth and said second correction signals to derive a seventh correction signal, utilizing said seventh correction signal to control the magnitude of said generated signal.

10. A static inverter circuit comprising a signal energized bus, an oscillatory signal source, an output circuit coupled to said signal energized bus, means connected to said output circuit to detect direct components of the inverter output, means connected to said output circuit to detect quadrature components of the inverter output, means connected to said bus to detect the magnitude and frequency of the signal on said bus, means to bring the direct component of the inverter output into an orthogonal relationship with the magnitude of the signal on said bus and means to bring the quadrature component of the inverter output into an orthogonal relationship with the frequency of the signal on said bus whereby the inverter output is synchronized with the signal on said bus.

* * * * *

UNITED STATES PATENT OFFICE
CERTIFICATE OF CORRECTION

Patent No. 3,675,037　　　　　　　　　Dated July 4, 1972

Inventor(s)　Billy H. Hamilton

It is certified that error appears in the above-identified patent and that said Letters Patent are hereby corrected as shown below:

Col. 5, Eq. 4, after "cos Φ" and before "Δe" change the equal sign to a minus sign.

Col. 11, Claim 1, line 57, change "$E_b$" to --$\hat{E}_b$--;

line 61, change "$E_b$" to --$\hat{E}_b$--;

Col. 12, Claim 1, line 71, change "$f_g = -k3$" to --$f_g = -k_3$--.

Col. 12, Claim 6, line 71, after "oscillator" delete "means to synchronize counting action therein with the counting action in said first bidirectional counter".

Signed and sealed this 2nd day of January 1973.

(SEAL)
Attest:

EDWARD M. FLETCHER, JR.　　　　　　　ROBERT GOTTSCHALK
Attesting Officer　　　　　　　　　　Commissioner of Patents